United States Patent [19]
Willey

[11] 4,379,584
[45] Apr. 12, 1983

[54] MOTORCYCLE SAFETY WINDSHIELDS

[76] Inventor: Barry A. Willey, 138 S. 8th Ave., Maywood, Ill. 60153

[21] Appl. No.: 241,434

[22] Filed: Mar. 6, 1981

[51] Int. Cl.³ .............................................. B62J 17/04
[52] U.S. Cl. ................................. 296/78.1; 280/289 S
[58] Field of Search ........................... 296/78.1, 84 R; 248/467, 205 A; 403/265, 266; 156/60; 280/289 S

[56] References Cited
U.S. PATENT DOCUMENTS

| 4,082,345 | 4/1978 | Willey | 296/78.1 |
| 4,087,110 | 5/1978 | Vetter | 296/78.1 |
| 4,166,650 | 9/1979 | Saunders | 296/78.1 |

Primary Examiner—Robert R. Song
Attorney, Agent, or Firm—James T. FitzGibbon

[57] ABSTRACT

The present invention relates generally to windshields and fairings for motorcycles and the like, and more particularly, to an improved motorcycle windshield which is secured to a portion of the motorcycle or like supporting structure in a novel manner so as to provide reduced breakage, improved safety, and other desirable advantages and characteristics.

27 Claims, 20 Drawing Figures

MOTORCYCLE SAFETY WINDSHIELDS

While most motorcycles are made by the manufacturers and sold to the public without windshields or other devices to afford air stream protection and better visibility, it is very common for windshields and fairings to be added to motorcycles as an aftermarket accessory. By "fairings" is meant a contoured or shaped windshield which may include, in addition to the windscreen, additional shielding elements, and/or mountings for headlights, turn signals, and reflectors; receiving means for smaller articles of luggage; panels or other mountings for auxiliary instruments, radios, etc.

In general, smaller and lighter motorcycles commonly add a simple windshield so as to deflect the wind, improve visibility and increase the comfort level of riding a motorcycle. The larger shields and/or fairings are often added to larger, touring motorcycles; the typical large fairing used on touring a motorcycle is mounted to the frame ("frame mount") rather than to the front wheel steering assembly ("handlebar mount"). Frame mounted fairings remain fixed relative to the chassis, while handlebar mounted units are fixed to and move with the steerable front end portion of the motorcycle.

While the expression "handlebar mount" is not entirely precise, as used in the art, the term implies merely that the fairing or windshield be mounted with respect to the portion of the motorcycle which moves with the steerable front wheel, and is not confined to true handlebar mounting alone. While the principles of the invention are applicable to both frame mounted and handlebar mounted fairings, the invention is normally applicable to handlebar mount fairings, and accordingly, the major description of the invention will be made with respect to handlebar mount windshields and fairings.

Referring now specifically to certain of the difficulties which the present invention is intended to overcome, prior art windshields, including windshields forming a part of larger fairings and simple or more complex windshields of the handlebar mount variety, although very tough when tested by conventional methods, quite commonly crack in use when subject to undue stress. Almost invariably, windshield cracking occurs because of stress concentrations in the mounting area, and specifically, where the mounting holes have been drilled or punched.

Previously, windshields have been secured by drilling the requisite number of holes in the plastic windshield material, commonly an acrylic ("lucite") or polycarbonate ("lexan") material and then inserting through the openings thus formed a bolt and nut assembly, various sleeves, etc. Normally, to provide freedom from shocks and other stress, the mounting hardware is protected by rubber grommets or bushings. These in turn are secured by fasteners of various known kinds.

In the prior art, the vibration and other stresses which are imposed on the windshield are concentrated in the mounting areas, and it is extremely common for windshields to fail in these areas. Every opening in a windshield, particularly small openings, creates so-called stress risers or areas of stress concentration, and it is in these areas that cracks develop, and these are the areas from which the cracks propagate. The common plastic materials are very "notch sensitive"; i.e., sensitive to stress risers; other, less sensitive materials lack the strength or the optical characteristics necessary for making good windshields.

Other attempts to mount windshields by providing tabs, etc., and drilling through them, have proved unsuccessful. This is because the tab or the like, if sufficiently small, is itself subject to high stress concentrations in its attachment area, and if it is sufficiently large, it merely, in effect, constitutes another part of the windshield through which the mounting opening is drilled. In any case, the problem of windshield cracking has been particularly troublesome with motorcycle windshields having mounting holes therein, and most particularly with the handlebar mount type of shield or fairing wherein the entire windscreen structure is mounted by passing through a small number of openings, usually two to four openings.

Besides freedom from stress cracks, another desired feature of a motorcycle windshield is that it will provide increased safety in case of an accident. As illustrated in the prior art, including U.S. Pat. Nos. 4,082,345 and 4,168,098, breakaway structures have been provided to insure that the windshield itself can be displaced forwardly in case the rider is thrown forward in an accident, and thus will not injure the rider. Such shield will permit him to be thrown forward and over the handlebar area rather than being injured in the face and chest area by a rearwardly protruding windshield or the mounting hardware associated therewith.

The patents referred to also disclose the concept of mounting hardware which is designed so as to be free from upwardly and/or rearwardly projecting portions likely to injure a rider thrown forward into or over.

In certain of these concepts, particularly the breakaway hardware mounting, the reduced strength portion of the mounting has been achieved by using fasteners made from nylon or other reduced strength material. While this is advantageous, when a windshield is mounted tightly enough to be secure against failure in normal use, considerable stress must be placed on the windshield, and such stress is again concentrated at the fasterner-receiving openings. Where the mounting hardware is kept relatively loose, the windshield is not properly secured, and the resulting freedom of movement may permit undesired movement leading to damage, or may be insufficient to secure the shield against being twisted from the cycle in use. In this connection, it will be realized that relative wind velocities encountered by a motorcycle may easily exceed 100 miles per hour, when vehicle speed and head wind velocity are taken into account.

Consequently, a desirable fairing or shield would combine the safety of the breakaway feature and safe hardware with an improved, secure but crack-free mounting.

In view of the shortcomings of the prior art, therefore, there has been a need for a motorcycle having a windshield or fairing which would provide the advantages of prior art cycle windshields, but which would provide reduced opportunity for breakage in use.

As a consequence, it is an object of the invention to provide an improved motorcycle windshield.

Another object of the invention is to provide a motorcycle windshield which provides a combination of tight mounting hardware sufficient to prevent displacement in use, but which minimizes or eliminates stress concentration of the mounted parts and creates greatly reduced likelihood of windshield cracking in use.

Another object of the invention is to provide a method of windshield mounting which provides esthetic improvements in use without sacrifice of function.

A further object of the invention is to provide a fairing which is easy to manufacture and easy to install by the user or by a mechanic.

A still further object of the invention is to provide a motorcycle windshield mount which can use a variety of mounting hardware, but which will provide both rigid mounting in use and a breakaway safety feature.

An even further object of the invention is to provide a cycle windshield in which the breakaway feature may be utilized without destroying or permanently damaging the windshield itself.

Another object of the invention is to provide a windshield mounting system which is highly "universal", that is, which may be applied to a variety of motorcycles without difficult adjustments, or the requirement that a variety of mounting hardware be used.

Another object of the invention is to provide a cycle windshield mounting structure in which all or some of the shield mounting is achieved by adhesively securing the rear surface of selected portions of the windshield to mounting hardware by an adhesive material, or other bonding means, rather than through use of hardware which extends through the shield itself.

An even further object of the invention is to provide a method of mounting a windshield which will provide adhesive mounting of the hardware to the windshield and which will provide a breakaway action in the event the shield is struck from the rear by the rider or passenger.

A still further object is to provide a motorcycle windshield having an attractive appearance but one which does not compromise the functional requirement of relatively rigid mounting and breakaway upon impact from the rear.

A still further object of the invention is to provide a motorcycle windshield mounting system which is easy to install, and which is compatible with a variety of mounting hardware.

Another object of the invention is to provide a windshield which is exceptionally easy to tilt or remove for cleaning, maintenance, or otherwise.

Yet another object is to provide novel windshield mounting systems, including improved upper and lower mountings which provide improved adaptability and universality in use.

The foregoing and other objects and advantages of the invention are achieved in practice by providing a cycle shield assembly which includes a transparent shield having bonded to at least the upper portion thereof a mount-receiving pad adapted to removably receive the end of a mounting rod remote from the end thereof secured to the cycle, and by providing a lower mount having a bonded pad portion and mounting hardware with a multi-axis movement feature.

DESCRIPTION OF THE PREFERRED EMBODIMENTS OF THE INVENTION

While the invention may be embodied in different forms, and may utilize a wide variety of different materials, and be used on a wide variety of machinery, a description of several preferred embodiments of the invention will be made wherein the windshield is of a so-called handlebar mount type, wherein the vehicle is a motorcycle, and wherein the windshield is adapted to pivot forward about one or more low placed pivots in the event of impact from the rear.

Figures 1, 2:
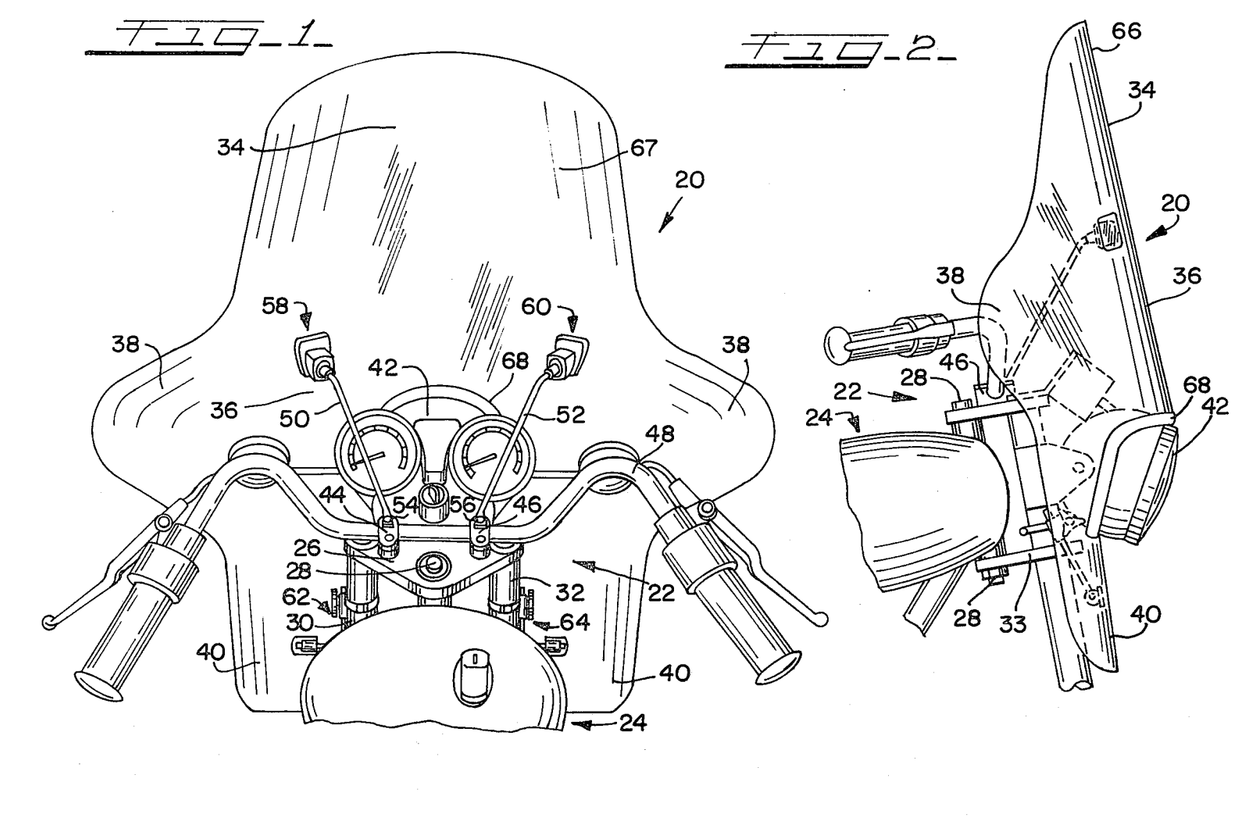
FIG. 1 is a perspective view taken from the rear of a motorcycle and showing the novel windshield and windshield mounting system of the invention in position of use.
FIG. 2 is a fragmentary side elevational view of the motorcycle of FIG. 1, showing the windshield of the invention in position of use.

Referring now to the drawings in greater detail, FIGS. 1 and 2 show a transparent fairing or shield generally designated 20 made according to the invention and associated in use with the steerable front end portion generally designated 22 of a motorcycle generally designated 24. The motorcycle 24 is shown to have an upper "triple clamp" or crown 26 mounted by a pivot stem 28 to a portion (not shown) of the motorcycle frame in a manner known to those skilled in the art.

Left and right hand fork tubes 30, 32 extend downwardly from the outer portion of the upper triple clamp 26. As is well known, the fork tubes 30, 32 form the upper or relatively fixed parts of the motorcycle fork assembly and these elements are held in place by the upper crown 26 as well as by a counterpart lower triple clamp assembly (33 in FIG. 2), keeping the fork tubes 30, 32 in parallel relation to each other. The motorcycle wheel (not shown) is mounted in a known manner between reciprocable slider units which surround the lower ends of the tubes 30, 32 and which move up and down as the wheel traverses bumps, etc. Consequently, the lower fairing mounting hardware is preferably positioned so as to be clear of the maximum upward movement of the sliders. Other than this requirement, the lower mounts may be positioned relatively higher or lower with respect to the lower fork tubes, and may lie above or below the lower triple clamp 33. While the lower portion of the shield may extend downwardly below the clamp 33, the shield should be positioned so that no parts interfere with the sliders or other reciprocable suspension parts of the cycle, including the fender, etc.

Referring again to FIG. 1, the windshield assembly 20 is shown to include an uppermost portion 34 through or over which the rider's vision is generally directed in use, an intermediate portion 36, which may include laterally outer protective elements 38 for the hands of the rider, and a lower area 40 which serves to mount the windshield. If the enlarged portions 38 of the intermediate section are omitted, and the lower portion 40 extends only to or slightly below the headlight 42 of the motorcycle, the assembly 20 is commonly referred to as a windshield rather than a fairing.

Referring again to FIG. 1, there are shown a pair of handlebar mounting caps 44, 46 which cover the bar-receiving bosses and secure the handlebars 48 with respect to the upper crown 26. Left and right hand windshield support rods 50, 52 terminate at their lower extremities in flattened ends 54, 56 which are secured to the caps 44, 46 by cap screws or other conventional fasteners.

At the upper end of the rods 50, 52 are a pair of identical top shield mounting assemblies generally designated 58, 60. Adjacent the lower part 40 of the shield 20 are a pair of lower mounting assemblies generally designated 62, 64, with each unit being secured to its associated fork tube 30, 32.

The construction of these mounting units is an important feature of the invention, and a detailed description of these elements is therefore set forth elsewhere herein.

Referring now to FIG. 2, a side elevational view of the windshield assembly 20 is shown, illustrating the shield in a typical position of use, with the front surface 66 thereof being inclined somewhat rearwardly. The shield 20 also includes a rear surface 67 (FIG. 1) to which further reference is made elsewhere herein. FIG. 2 also shows that a gasket or the like 68 is provided adjacent the inner margin of the fairing to engage the headlight 42 and, if desired, to provide an air tight seal therewith.

Figure 3:
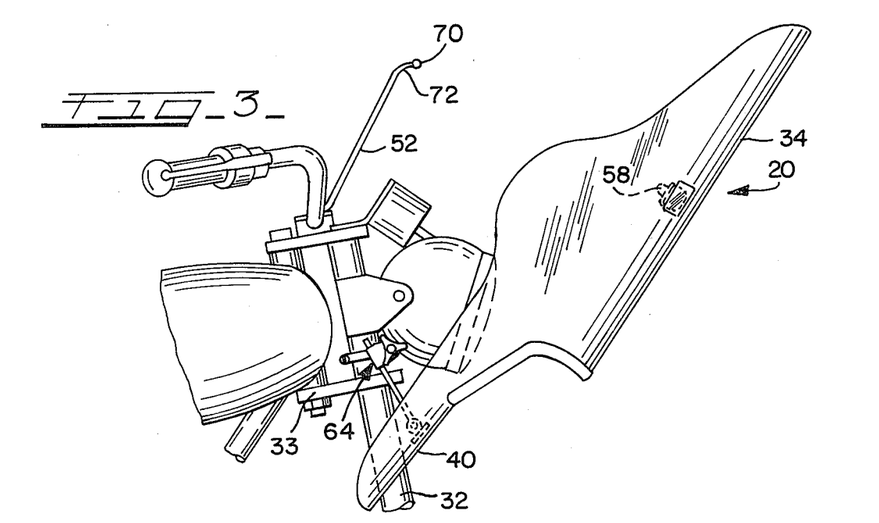
FIG. 3 is a side elevational view similar to that of FIG. 2, but showing the motorcycle windshield in its folded forward or "broken away" position of use.

FIG. 3 shows another side elevational view similar to that of FIG. 2 but in FIG. 3, the windshield assembly 20 is shown to be in the broken away position, with the lower portion 40 of the shield being secured with respect to the fork tube 32 and lower triple clamp 33, by the mounting hardware 64, but with the upper portion 34 of the shield tilted forwardly and with a portion of the upper end of the mounting rod 52 being shown as having broken away from the remainder of the upper mounting hardware. FIG. 3 further shows that, while the rod 52 with the ball end 70 remains with the handlebars, other parts of the assembly 58 remain bonded to the inner surface 67 of the shield 20.

As illustrated, the rods 50 and 52 extend upwardly and forwardly from the handlebars and terminate in generally horizontally extending portions 72 so that, in the event the motorcycle strikes a fixed or slower moving object, and the rider wheel is thrown forward, the upper mounting hardware will not injure the rider, nor will the rider's face, head or shoulders be injured by contact with the rearwardly directed edges or other surfaces of the fairing as a whole.

Consequently, the ability of the shield to tilt forwardly and downwardly under a force or impact directed forward the upper rear surface thereof is an important safety feature of the invention, and one which is achieved without compromising the ability of the windshield to resist rearwardly directed forces, including head winds and other forces encountered at high speed, wherein the shield is most necessary.

Figure 4:
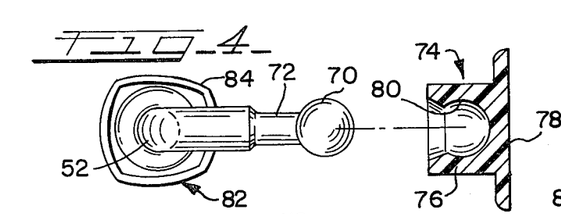
FIG. 4 is a greatly enlarged exploded view, partly in plan and partly in section, and showning the constructional details of one form of upper mounting assembly of the invention.
Figure 5:
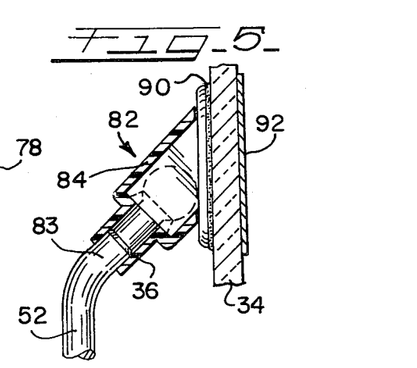
FIG. 5 is a side elevational view, with portions broken away, of the mounting hardware of FIG. 4, and further showing the relatively thereof to a portion of the windshield with which it is associated in use.

Referring now in detail to FIGS. 4 and 5, a preferred form of upper windshield mounting assembly 60 is shown. This unit, is the right hand unit 60 and is shown to include three principal portions, the mounting rod 52, the ball end 70 situated on the end of a neck portion 72 of reduced diameter, a ball end receiving pad generally designated 74 and shown to include a body 76, a windshield mounting surface 78, and a ball receiving socket 80.

The assembly 60 further includes a protective sheath generally designated 82 and shown to include a sleeve portion 84 which is contoured to fit snugly over the body 76 of the pad 74 and which further includes a reduced diameter collar 86 (FIG. 5) which is adapted to be received over the downturned end 83 of the rod 52.

As shown in FIG. 5, a portion of the windshield 34 is adapted to be secured to the face portion 78 of the pad assembly 74 by an adhesive 90, to which further reference will be made later. For decorative purposes, a foil strip 92 or the like may be used to cover that area of the windshield to which the pad surface 78 is attached by the adhesive 90.

Referring now to FIGS. 6-9, the constructional details of a typical lower mounting assembly 64 are shown. The elements of this assembly include a hose clamp generally designated 94 which is adapted to encircle a fork leg such as the leg 32 in FIGS. 1 and 2 and be secured thereover by manipulation of the adjusting nut 96. Hose clamps of this type are commercially available and known to be used for secure mounting of components of this type.

Another element of the invention is the fork engaging body generally designated 98 having a radially inner end 100 with a curved, leg-engaging surface 101 (FIG. 7) for snugly engaging the fork leg 32. A slot (not shown) permits the clamp 94 to extend through the inner portion 100 of the body 98 and to pass therethrough parallel to and spaced apart from the surface 101.

Referring again to FIG. 7, the body 98 is shown to include an insert 102 for receiving the threaded shank 104 of a fastener having a thumb wheel 106 acting as the head portion thereof.

The thumb wheel 106 secures together the two legs 108, 110 of a rod clamp assembly generally designated 112 and shown to include an opening 114 for receiving the upper or knarled shank portion 116 of the mounting rod 118 (FIGS. 6-9). As shown in FIGS. 6-9, when the rod clamp 112 is loosened by manipulating the thumb wheel 106, the rod shank 116 may be raised or lowered with respect to the clamp 112.

Another portion of the rod 118 is a horizontally extending end portion 120 which locates the lower shield holder of the assembly 122. The lower assembly 122 includes a pad portion 124 having a generally flat or slightly contoured front surface portion 126 and a rear body portion 128 with an opening 130 extending horizontally therethrough to receive the end 120 of the lower mounting rod 118. The face portion 126 of the pad 124 is adhesively secured to the windshield in the same manner that the forward surface 78 of the upper pad assembly 74 are mounted. As a result of the arrangement of the lower pad and the body opening 130, the lower pad can pivot about the axis of the rod end 120 so as to accommodate slightly different windshield position angles.

Figures 6, 8, 9, 19, 20:
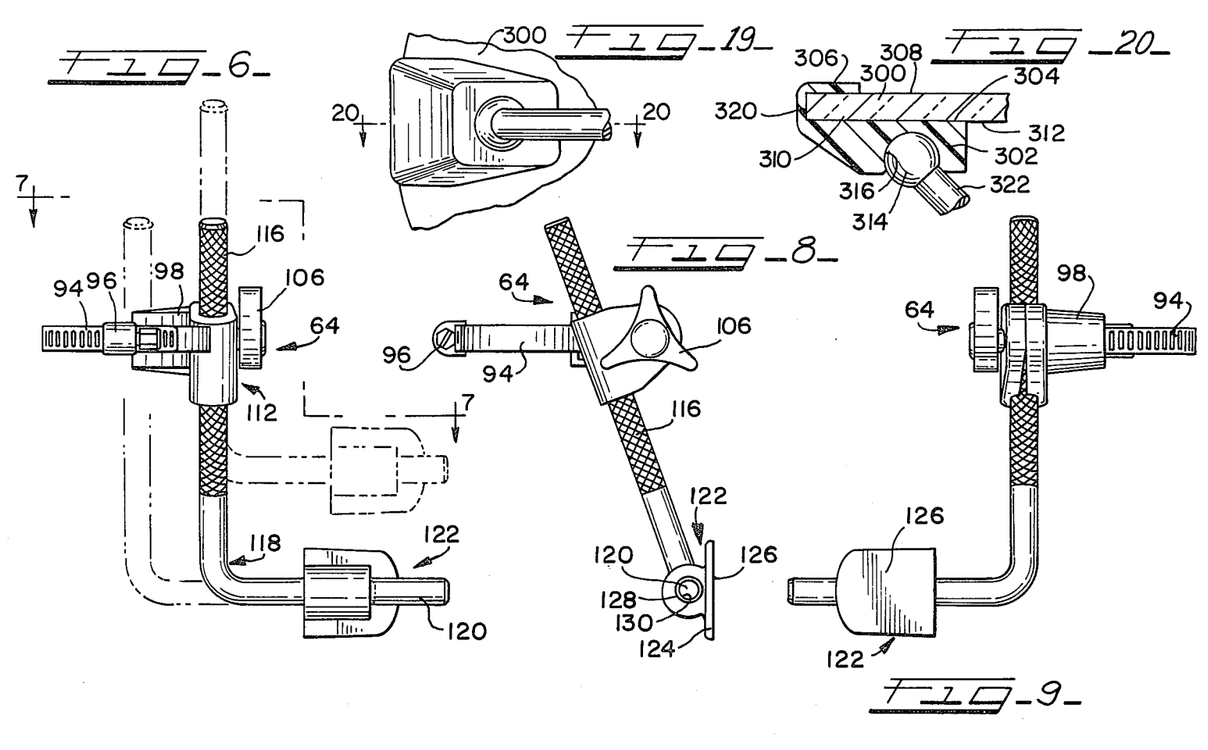
FIG. 6 is a greatly enlarged rear elevational view of the lower mounting hardware of the invention, with typical adjustable positions thereof being shown in phantom lines.
FIG. 8 is a side elevational view of the lower mounting hardware unit of FIGS. 6 and 7.
FIG. 9 is a front elevational view of the lower mounting hardware shown in FIGS. 6-8.
FIG. 19 is a fragmentary rear elevational view of an alternate form of lower mounting pad which embodies the principles of the invention, and which differs in detail from the embodiments shown in FIGS. 1-18.
FIG. 20 is a horizontal sectional view taken along lines 20—20 of FIG. 19, and showing details of the lower breakaway type mounting pad of the invention.
Figure 7:
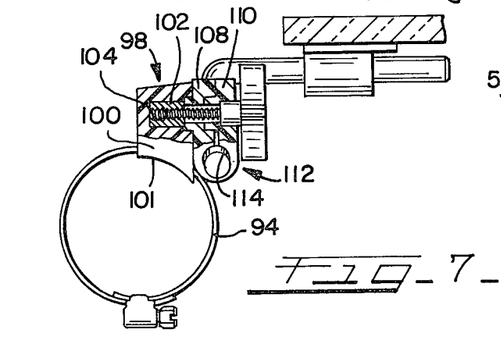
FIG. 7 is a plan view of the mounting hardware of FIG. 6, taken along line 7—7 thereof, and showing a portion of the windshield with which the mounting hardware is associated in use.

When installing the shield on a particular motorcycle, three-axis adjustability is made possible by use of the novel lower clamp assembly in the manner illustrated. In other words, referring to FIGS. 6 and 7, for example, it will be noted that the fork-engaging body 98 may be rotated about with respect to the fork tube 32 to secure laterally in and out movement, and relatively forward or rearward movement of the vertical end 116 of the rod 118. The rod clamp 112 may be loosened so as to permit the rod 118 to move upwardly or downwardly to a considerable extend vertically, and moreover, the rod clamp may be tilted as shown in FIGS. 6-8, for example. Accordingly, the lower portion of the windshield may be inclined, or moved forward or backward with respect to the associated fork tubes by means of the simple, multi-axis universal mounting.

Moreover, the provision of the hose clamp makes the unit readily adaptable to a variety of fork tube sizes. Customarily, on street-going motorcycles, the diameter of fork tubes varies from about 30 to about 38 millimeters, and this range of sizes can easily be accommodated with one or two hose clamps, and with one or not more than two fork tube clamps 98. The knurled surface of the upper part 116 of the rod 118 provides an improved grip so that the rod will remain in the position in which it is placed even under the moderate pressure occasioned by manipulating the thumb wheel 106.

Accordingly, from the foregoing description, it will be apparent that it is a simple matter to mount the novel windshield assembly of the invention on a motorcycle. Normally, in making such an installation, the upper rods 50 and 52 are secured in a known manner to the handlebar clamp caps simply by removing and replacing the cap screws holding the bar caps in place. In the alternative, the rods 50 and 52 may be secured to the handlebars by a known form of encircling or like clamp providing a certain amount of angular adjustment. The exact mounting of the lower portion of the upper bars not being a critical feature of the invention, only one form thereof is shown, although it will be understood that other forms of mounting structures may be used if desired.

Once the upper rods are mounted on the handlebars, the windshield and the upper mounting assemblies 58 and 60 are adhesively secured in place, the ball end 70 on the forwardly directed portion 72 of the rod 52 is pushed into its associated socket 80 with a snapping action. After the ball end is inserted in the socket, the cover sleeve 82 is positioned over the pad assembly 74 to complete the installation and impart a clean, finished appearance thereto.

Next, the lower clamp assemblies are positioned as shown. Inasmuch as the lower pad 122 is bonded at its front surface 126 to the lower portion 40 of the shield, it is merely necessary to slide the rod end 120 in or out, and the knurled portion 116 up or down until the hose clamp can conveniently encircle the fork tube with fork tube clamp 98 being positioned as desired.

In this connection, the lower portion 40 of the shield is desirably positioned so as not to interfere with associated parts of the motorcycle, such as the turn signals, horn, etc.; furthermore, the mounting system allows considerable latitude in adjusting the rake or inclination of the shield itself.

Providing adhesive bonding of the mounting hardware to the windshield virtually eliminates the problem of undue stress concentrations and the consequent problem of windshield cracking. In addition, the windshield is much easier to install, and scratching and other damage thereto is reduced. Still further, there is no difficulty in obtaining the correct amount of tension in the mounting hardware. With prior art shields, inexperienced users commonly over-or-under-tightened the mountings, which consisted of an opening through the shield, one or more rubber bushings, and associated bolts, nuts or tapped openings. In the prior art, for example, certain breakaway shield mounting assemblies included a nylon or like mounting bolt or screw which was adapted to break away when struck from the rear. With such relatively soft bolts, applying the desired torque was not easy, and often resulted either in breaking the screws, or mounting the shield so loosely that the shield suffered from undue vibration.

Conversely, the use of all-metal mounting assemblies was oftened accompanied by overtightening bolts, and thus raising the stress concentrations unduly in the areas wherein the windshield was most vulnerable to stress concentration damage, namely, at the mounting openings. According to the present invention, the adhesive mounting distributes the stresses uniformly, and does away with the need for multi-part, difficult-to-adjust mountings. Moreover, the universal or ball-and-socket type mountings provide better latitude and a better finished appearance.

In the past, if the shield were not properly aligned with respect to the brackets, the shield could be placed under considerable stress, inasmuch as the rods were stronger than the acrylic or "lexan" sheet material. This problem has largely been eliminated with the present fairing, since freedom of adjustment is provided in all dimensions.

Referring now to the preferred materials used in the practice of the invention, acrylic shields such as "Lucite" or "Plexiglas" are preferred. Mounting pads, including the upper pads 74 and the lower pad 122 are advantageously constructed from a moderately hard urethane rubber material. While other rubber or plastic materials are also suitable for use in practicing the invention, the urethanes provide the greatest dimensional stability with changing temperatures. Other materials tend to become unduly embrittled or unduly softened at the extremely low and high temperatures respectively.

The adhesive used is preferably a so-called second-generation acrylic adhesive of the types which are commercially available and well-known to those skilled in the art.

Besides the strong and relatively flexible acrylic adhesives, other adhesives may be used if they provided proper performance. These include urethane or epoxy cements, nylon type adhesives, etc., known to those skilled in the art. Preferably, the adhesive will have good film strength, and will fill irregularities well. Some otherwise desirable adhesives do not fill voids properly, and still others do not offer good low-temperature strength; however, the invention is not limited to the use of any particular adhesive.

Moreover, ultrasonic welding, induction heat welding, spin welding or still other techniques of bonding the mounting pad to the shield may be used. The pads are preferably factory mounted, but it is within the scope of the invention to have the user, dealer, or seller affix the pad to the shield by any suitable means, including the use of the above techniques or using pressure-sensitive adhesives covered with release coatings, for example.

If the windshield itself is constructed from a "Lexan" (polycarbonate) material, it is necessary to have the shield provided with a hard exterior surface coating. If "Lexan" shields are used, this hard surface coating should be removed by grinding or sanding prior to application of the adhesive.

Because the preferred mounting pad materials are a dark color, usually black, an attractive cosmetic appearance may be added to the finished shield by covering the pad or "footprint" of the upper and lower mounting pads with a thin metal foil film such as that shown as 92 in FIG. 5.

It is also possible to construct the windshields from other materials which are known to be used for this purpose, including CAB (cellullose acetate butyrate) or other materials.

While the form of shields shown in FIGS. 1-3 are presently thought to be the most advantageous, as is the mounting system shown, it is also possible to use different mounting constructions.

Figures 10, 11:
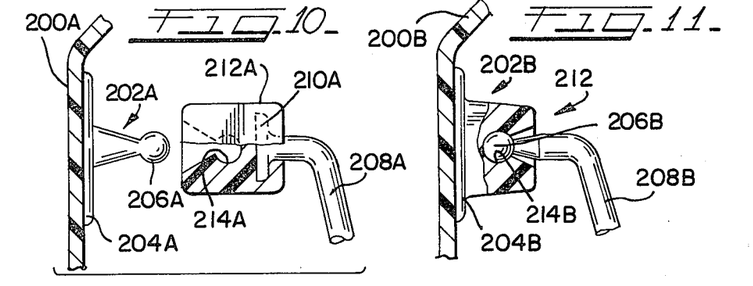
FIG. 10 is an enlarged view, partly in section and partly in elevation, of an alternative embodiment of the upper mounting hardware of the invention, showing two parts in exploded or disassembled relation.
FIG. 11 is a vertical sectional view of a further modified form of upper mounting hardware.

Referring now to FIGS. 10-18, a variety of different mounting structures are shown, most of the details of which are apparent from the drawings. In FIG. 10, for example, a construction is shown wherein the windshield 200A has adhesively affixed thereto a shield mounting pad assembly 202A which includes a pad proper 204A and a mounting ball 206A. In this construction, the rod 208A includes an enlarged flange 210A received within the body 212A of a breakaway assembly which includes a ball-receiving socket 214A.

In FIG. 11, the shield 200B includes a pad assembly 202B having a similar mounting pad portion 204B and a body 212B secured thereto. In this construction, the ball 206B on the rod 208B is received within the socket 214B.

Figures 12, 13:
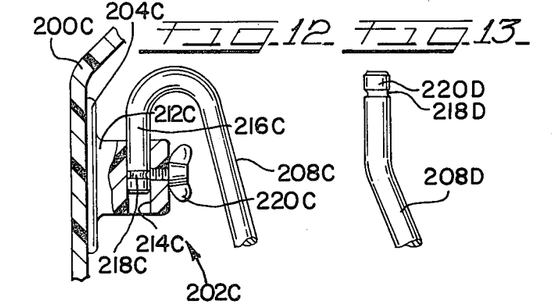
FIG. 12 is a view, partly in section and partly in elevation, showing a further alternative embodiment of the upper mounting hardware of the invention.
FIG. 13 is an elevational view of an alternative form of hardware suitable for use with the mounting assembly of FIG. 12.

In FIG. 12, a windshield 200C is shown to include a mounting pad assembly 202C which includes the pad proper 204C. The rod 208C has a down-turned end portion 216C with a grooved annular lower end portion 218C. In this construction, the pad body 212C includes a vertically extending slot 214C and means for receiving a thumb screw 220C, one end of which engages in the slot 218C. The downwardly directed rod end provides additional safety in upper mounting applications inasmuch as it is free from upwardly directed sharp ends which might injure a rider being thrown forward.

Figure 14:
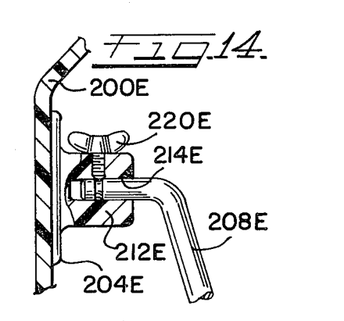
FIG. 14 shows a still further type of mounting structure.

FIG. 13 shows a rod 208D having the groove 218D in the end portion 220D, similar to the rod shown in FIG. 12. This form of rod may also be mounted in the same sort of pad. FIG. 14 shows a construction wherein a shield 200C uses a pad with a surface 204E similar to that shown in FIG. 12 and also having a similar body 212E. In this case, the rod construction 208E is almost the same as that shown in FIGS. 12 and 13, but the mounting screw 220E extends vertically, while the rod receiving opening 214E extends horizontally.

Figure 15:
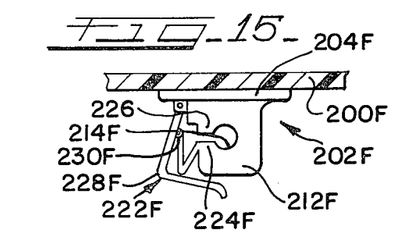
FIG. 15 is a top plan view of a still further modified form of mounting pad useful with the invention.

In FIG. 15, a windshield 200F is shown to include a pad body 202F having the pad proper 204F and a novel clamping assembly generally designated 222F. In this unit, the pad body 212F includes a vertically extending opening 214F for receiving a rod such as that shown in FIGS. 12-14. The body 212F is capable of clamping a rod therein when oppositely directed, adjacent body portions 224F, 226F thereof are pinched or otherwise moved closer together.

Figure 16:
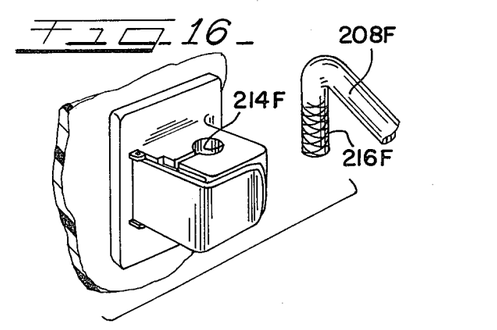
FIG. 16 is a perspective view of the mounting bracket of FIG. 15, showing the same in another position and illustrating the relation between the mounting rod and the paid used therewith.

For this purpose, a toggle unit 228 is provided which includes the hinged joints 230, etc., shown. In this construction, as the lever 228 is moved to the right and into contact with the body, the pivot point 230F moves toward the shield, pulling the clamp with it and tightly securing the rod in position within the opening 214F. The clamp 228F is preferably made of metal, and the body 212F from a rubber or plastic material. This provides a snap-over center or quick release opening and closing. FIG. 16 shows the unit of FIG. 15 in the closed position, and adapted to receive a rod 208F having a downwardly extending portion 216F thereof extending into or through the opening 214F.

Figure 17:
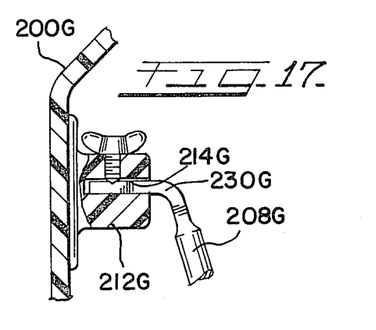
FIG. 17 is a view of still another mounting system useful with the present invention.

FIG. 17 shows a construction which is almost identical to that of FIG. 14, except that the shield 200G is secured by a body 212G having a flat slot 214G adapted to receive the flattened end portion 230G of the rod 208G. The screw arrangement is similar to that shown in FIG. 14.

Figure 18:
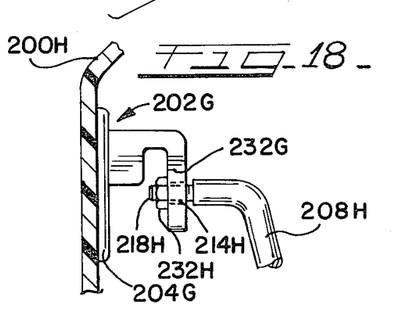
FIG. 18 is a view showing a still further modified form of mounting bracket and hardware assembly which may be used with the invention.

In FIG. 18, a shield 200H is shown to have a mounting system which includes the pad body 202G made from a relatively rigid material and shown to include a pad 204G and a downwardly extending rear flange 232G. This flange includes an opening 214H receiving the threaded end portion 218H of the rod 208H, with a nut 232H securing the rod end in place. It will be appreciated that the instructions shown in FIGS. 10-18 merely illustrate a different variety of mounting systems, most of which or all of which can be advantageously used as the upper or lower mounts, or both.

Referring now to FIGS. 19 and 20, a fairing mount system, particularly adapted for use as a lower mount, is shown. Here, the shield 300 is shown to be positioned by a mounting pad body 302 having a front surface 304 and a wraparound edge 306 partially covering the front surface 308 of the shield 300. Adhesive material lies at the interface 310 between the front surface 304 to the pad body 302 and the rear surface 312 of the shield 300.

A ball 314 is received in a socket 316 to provide universal movement and breakaway mounting. In this construction, the outermost edges of the shield are protected by the outer surface 320 of the body pad 302, and a waraparound mounting features is provided. While such construction might conceivably be used as an upper mount on a narrow shield also, it is generally preferred for upper mounts to use a construction such as that shown in FIG. 1, because it decreases the unsupported center span between the mounts and provides the best combination of rigidity and visibility.

FIGS. 19 and 20 also illustrate that a ball socket lower mount may be used, with or without the universal or three-axis pivoting inner mounts shown in FIGS. 6-9.

The amount of retention provided by the respective upper and lower mounts can be arranged by the construction of the unit so as to provide the breakaway and tilt-forward feature shown in FIG. 3, or to provide a total breakaway action, depending on the desires of the designer.

In certain constructions, such as those used in motor scooters, mopeds or very small motorcycles where the usual triple clamp assembly having a pair of fork down tubes is absent, the pad portions of the shield are advantageously secured to the cycle by brackets or the like which merely extend somewhat over and somewhat under the handlebars, and which may, therefore, not be mounted at their lower portions with respect to the fork tubes. In these constructions, the upper and lower pads may be spaced vertically or almost vertically only a short distance apart, for example, five to twelve inches. Consequently, the upper and lower mountings may be structurally or functionally the same; and may have common, as opposed to separate, mounting hardware. However, the advantages of the adhesive pad mounting of the present invention, including freedom from stress cracks, etc., are retained and are important even in these constructions.

Windshields made according to the present invention have proved highly successful both in testing and in use. It is believed that the major difficulties of the prior art fairings, namely, reliable breakaway systems and most importantly, freedom from stress-related cracks have been completely or virtually completely overcome. The shield and fairings of the invention not only feature outstanding performance in use, but increased ease of mounting, greater life, and very importantly, require less labor for installation. This makes the fairing attractive from the sales standpoint. This is because it appeals to the do-it-yourself user as well as to the user who will have the shield installed by professional mechanics.

The inclusive cost of the fairing, with mounting, is clearly lower where less labor is required to install and adjust the unit. Where shields made according to the present invention are damaged in use, such as in accidents, or are scratched or the like, repair and replacement is facilitated and the problem of mounting, including the adverse effects of the associated hole-related stresses, are largely if not completely overcome.

In certain instances, it is desirable to form one or more openings in a motorcycle windshield for ventilation or defrosting. These openings are sometimes fitted with inserts acting as adjustable vents or deflectors. Likewise, it is known to form the shield in two parts, with either the upper or lower part, or both, having a contoured edge defining a part of an air inlet, of much the same style as those found in an automotive windshield defroster. While windshields and fairings of the invention are preferably free from openings of any kind, because such openings create the stress concentration referred to above, it is nevertheless within the scope of the invention to provide a windshield having one or more openings therein, provided only that the windshield is held in position by an adhesive bond between one or more windshield surfaces and a mounting pad assembly to which hardware or other mounting means are affixed, including "break-away" hardware of the type referred to herein.

In the preferred form of shield, the portion adapted to be seen through by the rider is the uppermost portion, the portion of the shield which receives the upper mounting braces is a portion just below the uppermost portion, and two lower mounts which lie beneath the handlebars and in some cases just above or below the lower triple clamp, are provided. However, the invention may be practiced in forms wherein the viewing area is between or actually below parts of the braces, as in highly contoured shields; where the mounting pad pairs are just above and below the handlebars, as in Moped or scooter applications, or even where both sets of mounting pads are above handlebar level. The invention also comprehends a shield arrangement wherein only two mounting pads are used, and the remainder of the shield is mounted conventionally.

While the invention is advantageously used with break-away hardware, the invention is not confined entirely to break-away mounting.

While the handlebar mount arrangement is preferred, i.e., a mounting arrangement wherein the mounting braces are fixedly received in use with respect to the handlebar or other steering or front suspension assembly components of the motorcycle, it is also possible to provide a so-called frame mount fairing using the principles of the invention, and in such cases, the mounting braces would be attached with respect to the frame or fixed portion of the cycle rather than with respect to the steerable portion thereof.

In the latter type of construction, certain portions of the fairing might be fixed to the frame by conventional brackets and the shield would be located with respect to the other fairing parts by adhesive mountings of the type described herein.

It will thus be seen that the present invention provides an improved motorcycle windshield or fairing assembly having a number of advantages and characteristics including those pointed out herein and others which are inherent in the invention.

Various preferred embodiments having been described by way of example, it is anticipated that modifications to the described forms of windshields and fairings will occur to those skilled in the art and that such modifications and changes may be made without departing from the spirit of the invention or the scope of the appended claims.

I claim:

1. A cycle windshield assembly comprising, in combination, a wind deflector shield unit and a shield mounting portion, said shield unit having front and rear surfaces and a generally transparent first portion adapted to be seen through by the rider of an associated cycle and a second portion adapted to receive mounting braces, at least one pair of spaced apart mounting pad units, each of said pad units having a body portion and a front surface portion with a contour corresponding to the contour of said rear surface of said second portion of said shield unit, said mounting pad front surface portion being adhesively bonded to said rear shield surface, said mounting pad body portion being adapted to receive mounting braces which are in turn adapted to be fixedly received in use with respect to a forward portion of an associated cycle.

2. A cycle windshield assembly as defined in claim 1 wherein said at least one pair of spaced apart mounting pad units comprises two pairs of mounting pad units, one of said pairs being an upper pair and the other being a lower pair.

3. A cycle windshield assembly as defined in claim 1 wherein said second portion of said shield unit comprises a portion lying beneath said first portion, said second portion comprising an intermediate portion adapted in use to lie generally above the handlebars of an associated cycle, and a lower portion adapted in use to lie generally below the handlebars of said associated motorcycle in use.

4. A cycle windshield assembly as defined in claim 1 wherein said deflector shield unit is made entirely from a transparent acrylic plastic material, said shield being entirely free of openings therein.

5. A cycle windshield assembly as defined in claim 1 wherein said deflector shield unit is made entirely from a transparent polycarbonate plastic material having a scratch resistant coating on said front and rear surfaces thereof, said scratch resistant coating being continuous except where said mounting pad surface portions are adhesively bonded to said rear shield surface.

6. A cycle windshield assembly as defined in claim 1 wherein said mounting pad units are made from a stiff but resilient elastomeric urethane material.

7. A cycle windshield assembly as defined in claim 1 wherein said pad front surface and said shield rear surfaces are adhesively bonded by an acrylic adhesive material.

8. A cycle windshield assembly as defined in claim 1 wherein said pad body includes one portion of a ball-and-socket joint, and is adapted to receive the remaining element of said ball-and-socket joined to form an adjustable connection.

9. A cycle windshield assembly as defined in claim 1 wherein said pad body includes an opening therein adapted to receive a rod end portion therethrough to form a pivotable connection between said rod and said pad.

10. A cycle windshield assembly as defined in claim 1 which further includes, on said front surface of said shield unit, a decorative coating overlying the portion of said shield to which said pad is attached so as to impart an improved appearance to said shield.

11. A windshield assembly as defined in claim 2 wherein each of said lower pair of mounting pad units also includes a surface extending around an exterior edge of said shield and a surface adhesively attached to a portion of said front surface of said shield.

12. A cycle break-away safety windshield having means to prevent rearward movement of the shield with respect to the cycle under forces of a first magnitude, and adapted to break-away when acted on from the rear by a force of a much smaller magnitude, said windshield having front and rear surfaces, an upper portion adapted to be seen through by a rider, and a mounting portion, said mounting portion including an upper mounting system comprising at least two mounting pads having their front surfaces adhesively attached to said rear surface of said shield at spaced apart points on said rear surface of said shield, said pad units including cooperating means forming a part thereof for attachment to associated shield mounting braces, said cooperating means permitting the attachment connection between said shield and said braces to be broken away without damaging said shield under said force of smaller magnitude.

13. A windshield as defined in claim 12 which includes attachment means for attaching the lower part of said shield to an associated motorcycle, said attachment means including means for forming a pivoting connection between said shield and said associated cycle, whereby, when said braces and said mounting pads are broken away from each other, the upper part of said shield may tilt forwardly and downwardly.

14. A windshield as defined in claim 13 wherein said lower part includes a pair of mounting pads having their front surfaces adhesively attached to at least a portion of said rear surface of said shield at spaced apart points thereon.

15. A cycle windshield assembly, comprising, in combination, a wind deflector shield having transparent upper portion adapted, in position of use, to be seen through by a rider, and intermediate and lower shield portions, each of said intermediate and lower portions including brace receiving pads having portions thereof adhesively affixed to the rear surface of said windshield, said upper brace-receiving pads including means thereon cooperating in use with a portion of an associated brace to enable said windshield to be broken away from said brace when said windshield is struck from the rear.

16. A cycle windshield assembly as defined in claim 15 wherein said lower brace-receiving pads include means thereon cooperating in use with a portion of an associated motorcycle to form a pivotable connection between said lower portion of said shield and said associated motorcycle.

17. A cycle windshield mounting system comprising, in combination, at least a pair of mounting units adapted to be fixedly mounted with respect to the steering and front suspension portions of an associated motorcycle, said mounting units also having portions extending at least partially upwardly and forwardly from the cycle mounting portions thereof, said mounting units terminating in windshield mounting pad assemblies having forwardly directed, shield-engaging pad surfaces adapted to be adhesively attached to spaced apart portions of the rearwardly directed surface of an associated motorcycle windshield.

18. A mounting system as defined in claim 17 wherein each of said pad assemblies includes a pressure sensitive adhesive covering said shield engaging pad surface, said adhesive, in turn, being covered by a protective release coating.

19. A method of manufacturing a motorcycle windshield assembly, said method including cutting a transparent shield material into a desired shape, forming said shield into a desired contour for association with a motorcycle, providing at least a pair of windshield mounting pad assemblies each having a body portion adapted to cooperate with shield mounting braces and a front surface portion having a contour corresponding to a portion of the rear surface of said shield, and adhesively bonding said front surface portions of said mounting pads to said rear surface of said shield.

20. A mounting hardware assembly for a motorcycle windshield, said assembly including lower left and right hand mounting assemblies, each of said mounting assemblies including a pad unit having a pad body with a brace-receiving opening therein, and a generally forwardly directed, windshield-engaging pad surface adapted to be adhesively secured to an oppositely directed surface of an associated motorcycle windshield, a brace mounting assembly adapted to be secured to a portion of a motorcycle fork assembly, said brace mounting including a brace receiver assembly, means for tightening said receiver assembly around said brace, a clamp for attaching said receiver assembly to a portion of said fork assembly, and a brace unit having one end portion received within said pad body opening and the other end in said brace receiving assembly, said tightening means, said clamp, and said receiving opening being arranged to permit three-dimensional positioning adjustment of said pad body with respect to an associated motorcycle.

21. A break-away windshield mounting assembly adapted to cooperate with a motorcycle windshield and at least one motorcycle windshield mounting brace in positioning said windshield in relation to an associated motorcycle, said mounting assembly comprising, in combination, a portion adapted to be securely affixed by adhesive bonding to a portion of a windshield lying above the handlebars of an associated motorcycle, and a portion for removably receiving a portion of an associated mounting brace, said receiving portion being adapted to receive cooperating means on said mounting brace to provide a connection between said mounting assembly and said mounting brace which will prevent movement of said portion of said windshield to the rear under a rearwardly acting force of a first magnitude, but which will permit said mounting assembly to break away from said portion of said mounting brace under a forwardly directed force of substantially less magnitude than said rearwardly directed force.

22. In combination, a break-away windshield mounting assembly as defined in claim 21 and a mounting brace associated therewith and forming said break-away connection.

23. A break-away windshield mounting assembly as defined in claim 21 wherein said portion of said mounting assembly adapted to be securely affixed to said windshield includes front and rear face portions adapted to receive therebetween peripheral portions of the rearwardly and forwardly directed surfaces of an associated motorcycle windshield assembly.

24. A break-away windshield mounting assembly as defined in claim 22 wherein said cooperating means comprises a ball and socket joint, with the ball portion forming a part of one of said receiving portion and said mounting brace, and said socket forming a part of the other of said receiving portion and said mounting brace.

25. A break-away windshield mounting assembly as defined in claim 22 wherein said cooperating means includes an area of weakness forming a part of at least one of said receiving portion and said mounting brace.

26. A cycle breakaway safety windshield assembly adapted to be mounted so as to prevent rearward movement of the shield with respect to the cycle under forces of a first magnitude, and adapted to break forwardly away when acted upon from the rear by a force of substantially smaller magnitude, said windshield having front and rear surfaces, an upper portion adapted to be seen through by a rider, and a portion adapted to receive an upper mounting assembly, said windshield assembly further including an upper mounting assembly comprising at least two mounting units each having a portion thereof securely affixed by adhesive bonding to said mount-receiving portion of said windshield, said mounting units being positioned at spaced apart points on said windshield, each of said mounting units also including means forming a part thereof for cooperation with portions of a pair of windshield assembly mounting braces, said cooperating means being constructed and arranged so as to permit a ready attachment connection to be made between said portion of said mounting unit and an attachment portion of said mounting braces, and further permitting said cooperating means to be broken away from each other without damaging said shield when said windshield is acted upon from the rear by a force of at least said smaller magnitude.

27. A cycle break-away safety windshield assembly as defined in claim 26 wherein said cooperating means comprises a ball and socket joint.

* * * * *